Nov. 8, 1938.  S. TROY  2,136,092
METHOD OF MAKING ELASTIC LEATHER
Filed March 10, 1937
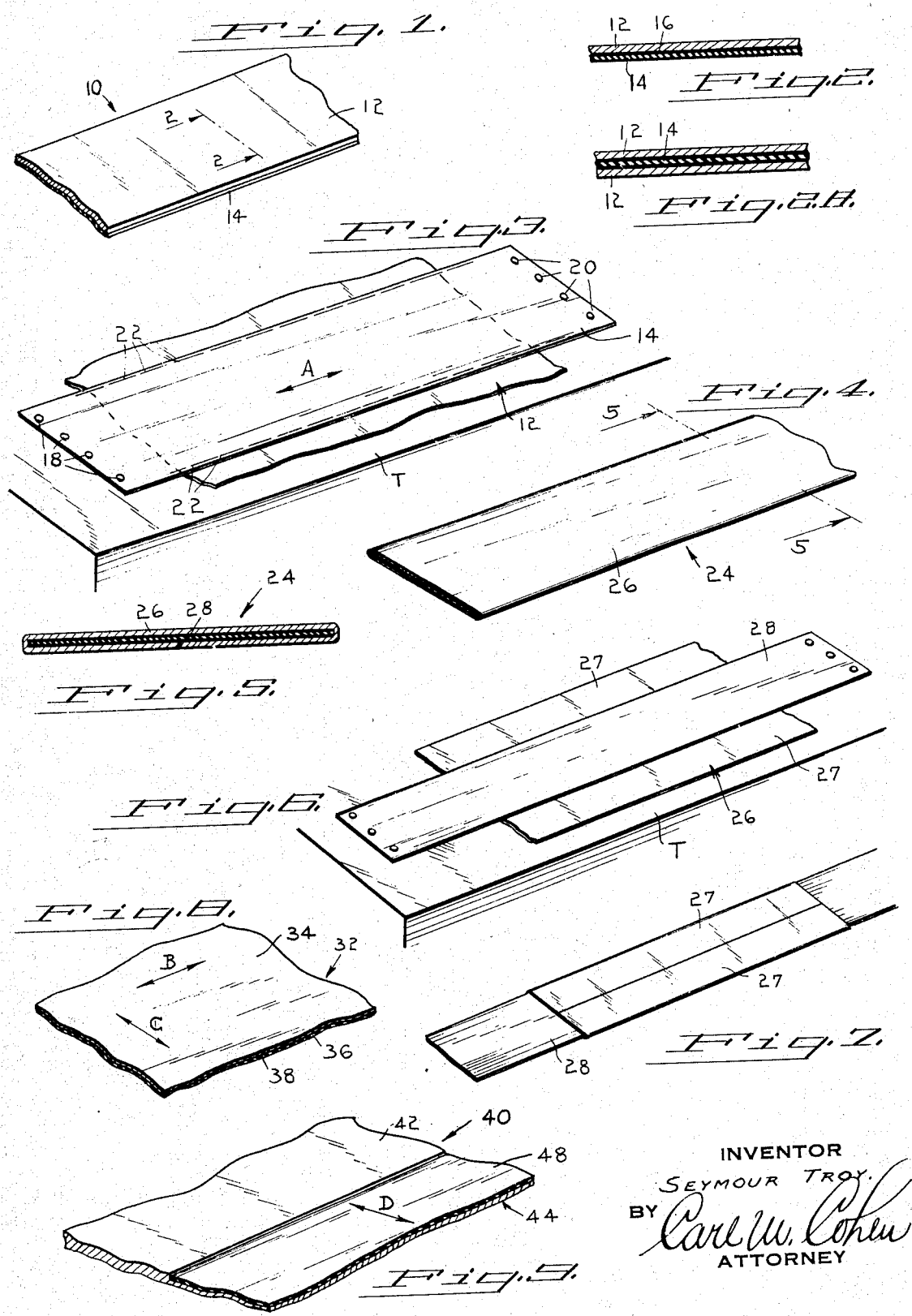
INVENTOR
SEYMOUR TROY
BY Carl M. Cohen
ATTORNEY Patented Nov. 8, 1938

2,136,092

UNITED STATES PATENT OFFICE 2,136,092

METHOD OF MAKING ELASTIC LEATHER

Seymour Troy, New York, N. Y.

Application March 10, 1937, Serial No. 129,989

3 Claims. (Cl. 69—21)

This invention relates to leather and, more particularly, to leather of the kind which is used for shoe uppers, ladies' handbags, purses, etc., for example, suede, kid skin, and other thin, soft and flexible leather.

It is frequently necessary or desirable in the manufacture of numerous articles to utilize elastic material or to provide said articles with one or more portions which can stretch and contract. When such articles, as for example, shoes are made of leather numerous difficulties are encountered as leather is inelastic. Moreover in a great many instances, particularly in view of certain structural or design requirements it is impractical or impossible to use elastic materials of the kinds heretofore known. In short, there is a substantial demand for leather which is elastic and yet is of the same appearance as inelastic leather. The provision of elastic leather having the appearance of inelastic leather, especially with respect to the smoothness and non-wrinkled character thereof, constitutes the main object of the present invention.

Another object of the invention is to provide leather which is inelastic in one or more portions and elastic in one or more other portions integral with said inelastic portion or portions.

Heretofore when leather was combined with elastic materials such as sheet rubber or elastic woven or knitted fabric, in order to obtain a composite elastic material including leather as an element thereof, a necessary characteristic of the material was the gathering or wrinkling of the leather in the contracted condition of the material to permit elongation when the rubber is stretched. Furthermore, such material is usually stretchable only in one direction, i. e., in a direction at right angles to the gathers in the leather. Composite elastic material including a leather layer may be made in accordance with the present invention so that its elasticity is non-directional and hence may stretch and contract in all directions. This constitutes another object of the invention.

I have succeeded in producing elastic leather in accordance with the method which will hereinafter be described with reference to the accompanying drawing.

In the drawing:

Fig. 1 is a perspective view of a piece of elastic leather embodying the present invention;

Fig. 2 is an enlarged sectional view on the line 2—2 of Fig. 1;

Fig. 2A is a view similar to Fig. 2 illustrating composite material having leather layers on both sides thereof;

Fig. 3 is a more or less diagrammatic view illustrative of my method of producing elastic leather;

Fig. 4 is a fragmentary perspective view of composite elastic material having leather on both of its surfaces;

Fig. 5 is an enlarged sectional view on the line 5—5 of Fig. 4;

Figs. 6 and 7 are perspective views illustrating successive steps in the method of making the elastic material illustrated in Fig. 4;

Fig. 8 is a perspective view of a piece of elastic leather possessing non-directional elasticity;

Fig. 9 is a perspective view of a piece of leather having elastic and non-elastic portions.

Referring to the drawing in detail, there is shown in Figs. 1 and 2, composite elastic material 10 comprising a leather layer 12 and a layer 14 of any suitable elastic material such as sheet rubber or elastic fabric, here shown as relatively thin sheet rubber. Said layers 12 and 14 are united firmly throughout their contiguous surfaces by an interposed layer 16 of rubber cement. As illustrated in Fig. 2A, a second layer of leather may be disposed over the other surface of the layer 14 and similarly united thereto by rubber cement. The rubber cement which is preferably utilized for my purpose is of the well known kind commonly used for mending the inner tubes of automobile tires.

In producing the elastic leather illustrated in Fig. 1, there is utilized leather skin such as suede or kidskin which is relatively soft and flexible and is somewhat thinner than the usual run of skins of this character. For the purpose of the present invention, in utilizing leather skins of average thickness, such skins are reduced in thickness by skiving or splitting. Thus, the first step in the method is to provide a leather skin or leather skin portion of suitable thickness less than that of the average skin thickness. For best results the thickness of the skin is preferably about 1/32 of an inch. Said thin skin or skin of reduced thickness is then placed in flat condition upon a suitable table or other support T, as illustrated in Fig. 3, and temporarily secured thereto in any suitable way as by a few tacks (not shown) at the ends of the skin. As illustrated in Fig. 3, the skin 12 is placed on the table T with the wrong side of the skin uppermost. Either at this time or as a preliminary operation, the surface of the wrong side of the skin is roughened throughout by sandpaper or in some other suitable way. Then rubber cement is applied to said roughened surface of the skin and to a surface of the elastic material 14, said surface having been previously roughened. Then the elastic layer 14 is anchored at one end thereof to the table T in any suitable way as by removable tacks 18 and stretched lengthwise as indicated by the arrow A and secured in stretched condition at its other end as by tacks 20. Then while said elastic layer 14 is in stretched condition, and while the adhesive applied thereto and to the leather layer 12 is still somewhat tacky, said layers are firmly pressed together to firmly unite them adhesively throughout their contiguous surfaces. After a few minutes or when the adhesive is set and the said layers are firmly united the tacks or other means utilized for securing the elastic layer in stretched condition, and the tacks or other means utilized for temporarily fastening the leather layer to the table, are removed thus releasing the tension on the elastic layer and permitting the same to contract.

The composite material thus produced possesses substantial elasticity, the leather and rubber layers being stretchable and contractable as a unit without visible wrinkling or gathering of the leather layer. Measurements of the lengths of layers 12 and 14 before and after their attachment to each other in the manner just described, indicate that the length of the leather layer 12 is decreased in the composite elastic material in its normal contracted state, while the length of the elastic layer 14 in said composite material, in its normal contracted state, is intermediate the lengths thereof in its stretched and unstretched states and hence is partially stretched. It is found, however, that although the leather layer 12 has been reduced in length the flat and smooth condition of its outer surface is not impaired, but on the contrary is, at least to the naked eye, as smooth as ordinary leather skin with which the art is familiar.

In producing the elastic leather by the method described above, it is preferable that the leather layer 12 be somewhat wider than the layer 14 of elastic material in the stretched condition of the latter as illustrated in Fig. 3. When such wider layer is used and attached to the elastic layer as described above, it is found that in the resulting composite elastic material marginal portions of the leather layer at opposite side edges of the elastic layer are gathered or wrinkled, but that the intermediate portion which overlies the elastic layer and is adhesively united therewith is smooth, as hereinbefore stated. Unless said gathered or wrinkled marginal portions are desired they are removed by cutting through the composite material along longitudinal lines 22 inwardly of the side edges of the elastic layer.

For producing composite elastic material having leather layers on both sides, as illustrated in Fig. 2A, the second leather layer 12 is adhesively united with the elastic layer 14 while the latter is in stretched condition, as illustrated in Fig. 3, in which case said second layer is also preferably wider than the interposed elastic layer and hence said three layers are cut through along longitudinal lines, such as indicated at 22 in Fig. 3, producing composite elastic material having leather layers on both sides thereof. In the material thus produced, the side edges of the interposed elastic layer are visible at the side edges of the composite material which may be desired for obtaining edge portions of contrasting appearance in said composite material.

As shown in Figs. 4 and 5, the interposed layer of elastic material is completely covered by leather. For this purpose there is utilized a piece of leather 26 which is superposed on one surface of the elastic layer 28 and folded over the opposite surface of said layer, and adhesively united with both of said surfaces and completely covering the latter as well as the side edges of said intermediate elastic layer. For producing the composite elastic material here shown, the piece of leather layer 26, wide enough to cover both surfaces of the elastic layer 28, is roughened and coated with rubber cement and then the rubber layer 28 in stretched condition is adhesively united with said leather layer between the side edges of the latter. Then the marginal portions 27 of the leather layer are adhesively united with the other surface of the rubber layer 28 while said rubber layer is still under tension. After the adhesive has set, the tension on said rubber layer is released. As in the case of the material 10, it is found that the length of the leather piece 26 has decreased, while the length of the interposed elastic material 28 is intermediate the lengths thereof in its stretched and unstretched condition, but the outer surfaces of the leather are smooth and the composite material is elastic.

In accordance with another form of the invention, composite material which is elastic in at least two directions may be produced. Such material is illustrated in Fig. 8, and is designated by the reference numeral 32. As here shown, said material comprises a leather layer 34 and a layer of sheet rubber or other elastic material 36 adhesively united throughout their contiguous surfaces by rubber cement 38. In producing this material, a method similar to that described above for producing the composite elastic material 10, is utilized, but instead of stretching the layer of elastic material 36 in one direction, said material is stretched in two directions at right angles to each other, and while under tension, is firmly united with the leather layer. Upon release of the tension, it is found that the composite elastic material can stretch and contract in at least two directions, as indicated by the arrows B and C.

In the form of the invention illustrated in Fig. 9, leather having elastic and non-elastic portions in integral relation is produced. Thus, as here shown, the material 40 has an inelastic portion 42 and an elastic portion 44. For producing this material, the skin is reduced in thickness in the portion thereof to which elasticity is to be imparted. Then a layer 48 of sheet rubber or other suitable elastic material in stretched condition is firmly united with said thinned portion 46 of the leather skin as described above.

It will be understood, however, that in attaching the tensioned layer of elastic material to the leather, the extent to which the elastic layer is stretched may vary depending upon the degree of elasticity to be derived in the composite material, and depending also on the character of the material utilized as the elastic layer. When utilizing elastic sheet rubber for imparting the elasticity to suede leather about $\frac{1}{32}$ of an inch thick, said sheet rubber is preferably somewhat thinner than the leather, and for best results said sheet rubber is stretched so that its length is increased only about 25%.

The uses to which the elastic leather embodying the present invention may be put will be readily understood particularly by those skilled in the art relating to the manufacture of shoes, ladies' handbags, purses, belts for dresses, etc. Thus, for example, said elastic leather may be used in shoe uppers for permitting the upper to stretch at the foot opening of the shoe, either completely therearound or at the instep portion, as in a pump for preventing cutting of the wearer's foot at the instep; also, fastening straps for low shoes may be made wholly or partly of this elastic rubber and when so made it will be possible to eliminate releasable fastening devices such as buckles and buttons. It will be understood, however, that since the invention is capable of numerous other uses I do not wish to be limited to those herein specified. It will be understood that various changes in the constructions and methods herein disclosed may be made and will occur to those skilled in the art. Therefore, I do not wish to be limited precisely to the present disclosure, except as may be required by the appended claims considered with reference to the prior art.

Having thus described my invention, what I claim as new and useful is:

1. The method of making elastic leather which comprises providing a layer of soft and flexible leather such as suede or kidskin, stretching a layer of elastic sheet material over said leather, interposing a layer of rubber cement between said layers of leather and elastic sheet material, pressing the contiguous surfaces of said layers together while said elastic sheet material is stretched and under tension and while said leather layer is unstretched whereby to adhesively unite said layers in superposed relation while said layer of elastic material is in said stretched and tensioned condition, and thereafter releasing said layer of elastic material from extraneous tension.

2. The method of making elastic leather which comprises providing a layer of soft and flexible leather such as suede or kidskin of a thickness not exceeding about $\frac{1}{32}$ of one inch, stretching a layer of elastic sheet material over said leather, interposing a layer of rubber cement between said layers of leather and elastic sheet material, pressing the contiguous surfaces of said layers together while said elastic sheet material is stretched and under tension and while said leather layer is unstretched whereby to adhesively unite said layers in superposed relation while said layer of elastic material is in said stretched and tensioned condition, and thereafter releasing said layer of elastic material from extraneous tension.

3. The method of making composite sheet material which has an elastic portion and an elastic portion which comprises reducing the thickness of a portion of a layer of soft and flexible leather such as suede or kidskin, stretching a layer of elastic sheet material over said leather portion of reduced thickness, interposing a layer of rubber cement between said elastic layer and the contiguous surface of said portion of the leather layer, pressing the contiguous surfaces of said layers together while said elastic sheet material is stretched and under tension and while said leather layer is unstretched whereby to adhesively unite said layers in superposed relation while said layer of elastic material is in said stretched and tensioned condition, and thereafter releasing said layer of elastic material from extraneous tension.

SEYMOUR TROY.